March 10, 1970 M. BENITEZ, JR., ET AL 3,499,681
HUMAN RESTRAINT SYSTEM
Filed April 20, 1967 4 Sheets-Sheet 1
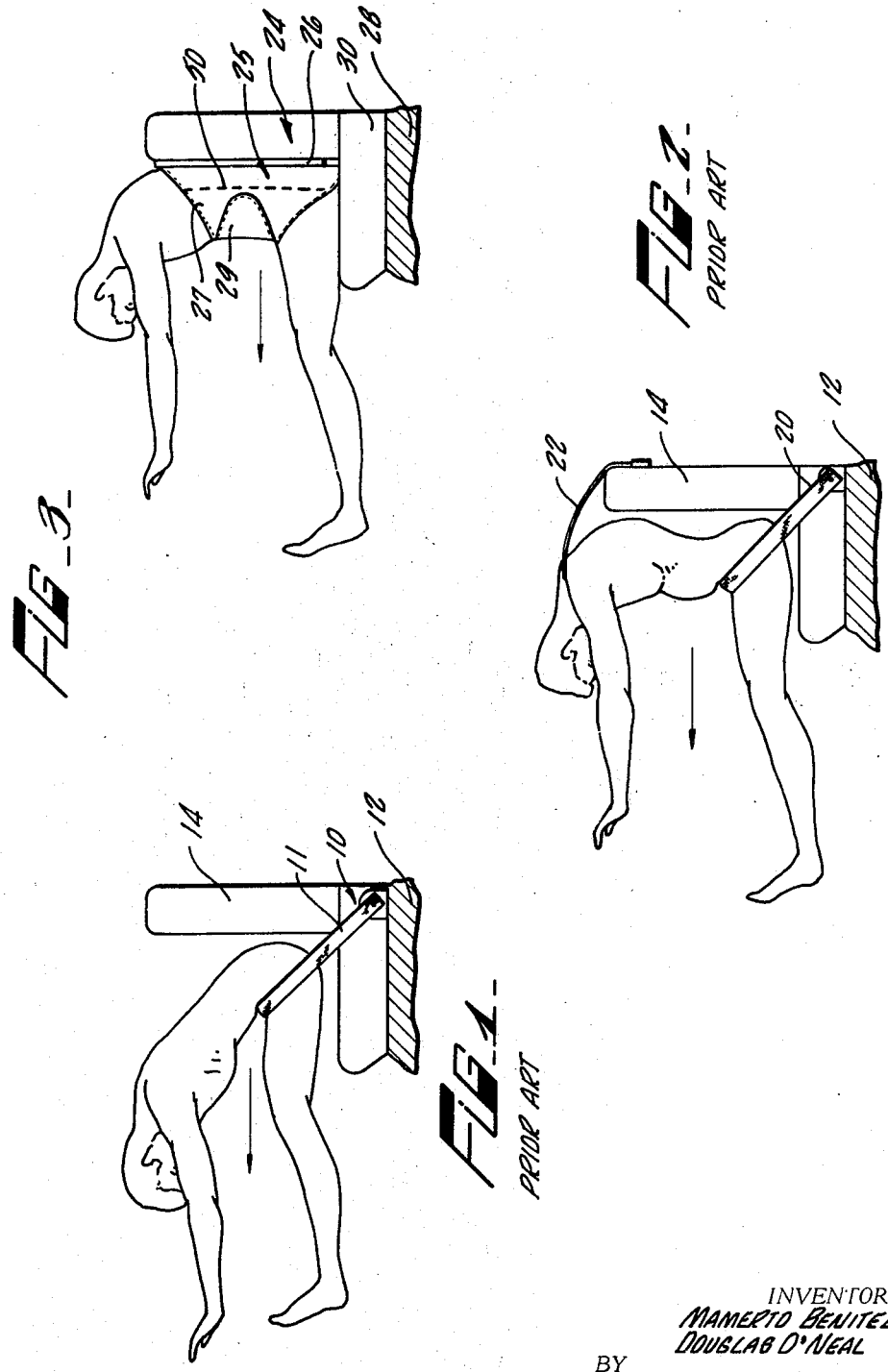
INVENTORS.
MAMERTO BENITEZ, JR.
DOUGLAS O'NEAL
BY
Christie, Parker & Hale
ATTORNEYS

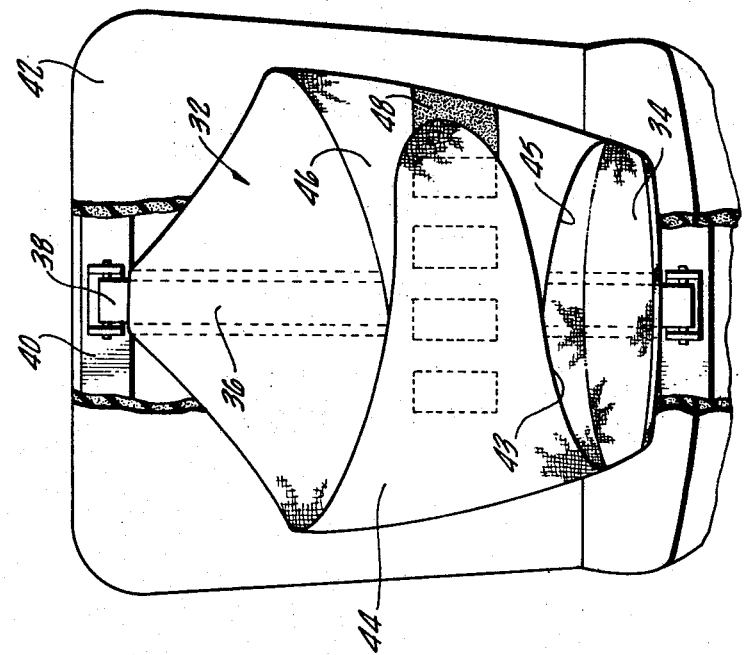
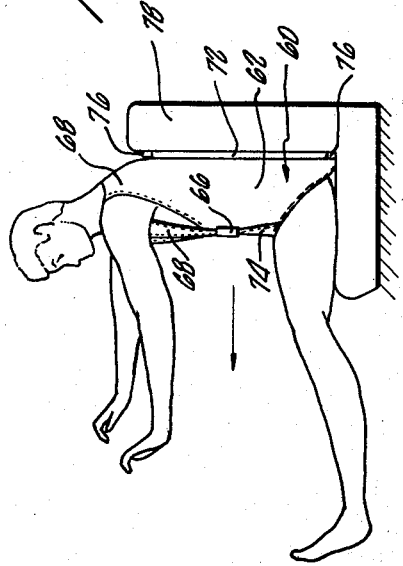
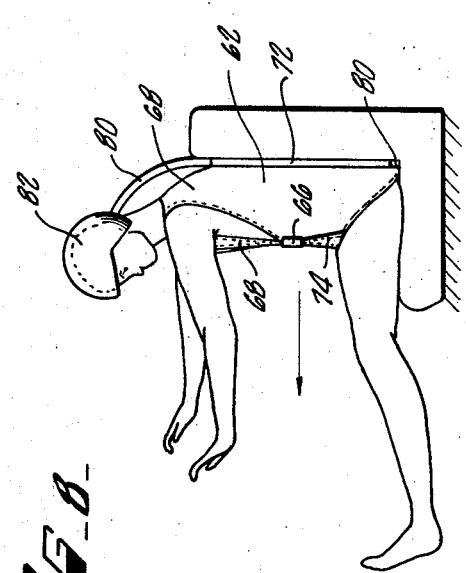

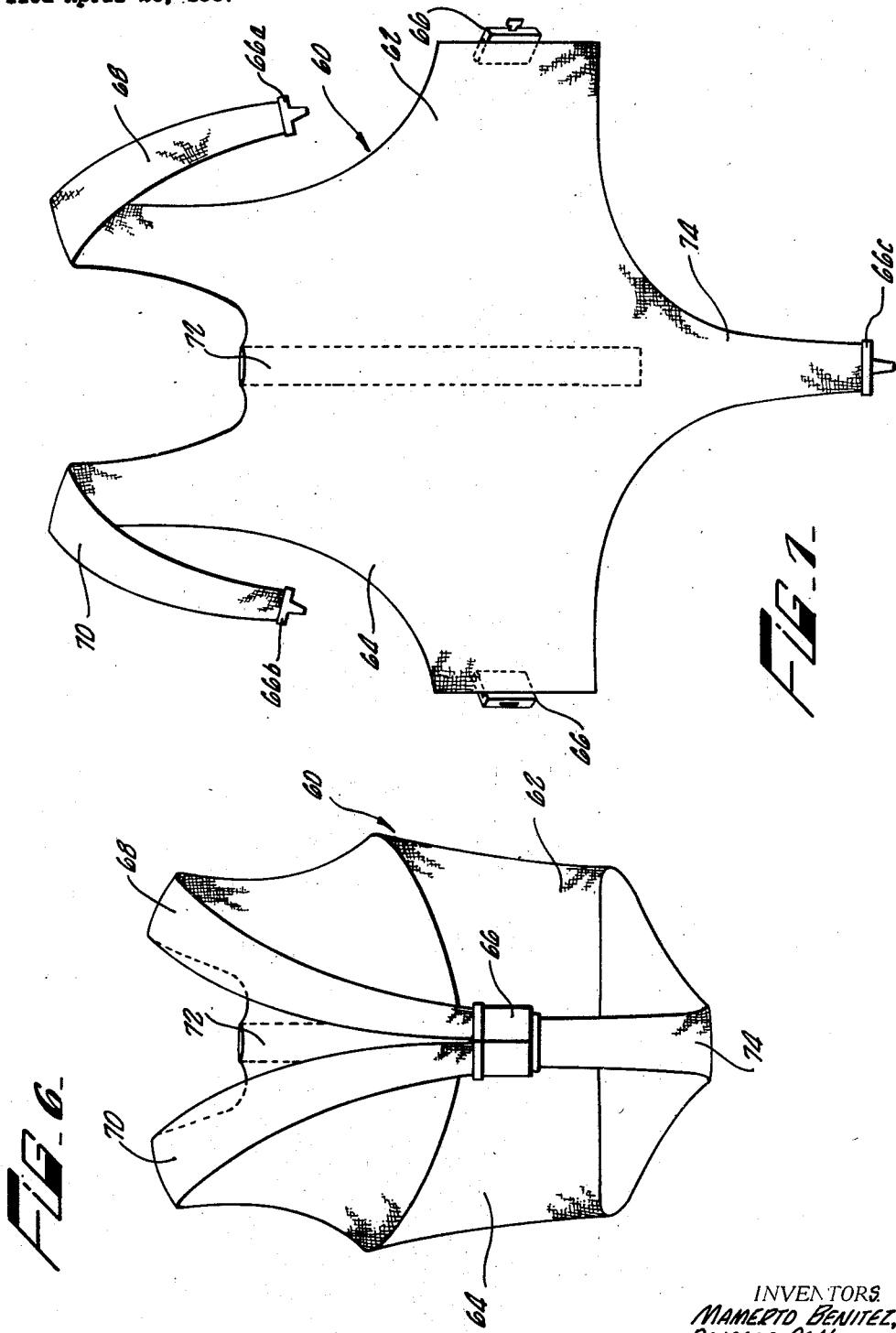

March 10, 1970    M. BENITEZ, JR., ET AL    3,499,681
HUMAN RESTRAINT SYSTEM
Filed April 20, 1967    4 Sheets-Sheet 4

INVENTORS.
MAMERTO BENITEZ, JR.
DOUGLAS O'NEAL
BY
Christie, Parker & Hale
ATTORNEYS 3,499,681
HUMAN RESTRAINT SYSTEM
Mamerto Benitez, Jr., Granada Hills, and Douglas O'Neal, Malibu, Calif., assignors, by mesne assignments, to Hardman Aerospace, Los Angeles, Calif., a corporation of California
Filed Apr. 20, 1967, Ser. No. 632,310
Int. Cl. B60r 21/10; A62b 35/00
U.S. Cl. 297—385          20 Claims

ABSTRACT OF THE DISCLOSURE

A constraining vest is held in place through a columnar support member which is generally oriented along the line of an occupant's spine and attached to the vehicle in which the system is installed. The vest includes flaps which are configured to extend from the columnar support around the occupant such that his pelvic region, abdomen and lower chest are constrained. Access to and egress from the vest are provided by fasteners on the flaps which may be operated at the behest of the occupant. Modifications of the restraint system are directed to supporting the upper portion of the torso by shoulder flaps and an occupant's head by extension of the columnar support.

BACKGROUND OF THE INVENTION

This invention relates to the art of restraining an occupant in a vehicle under impact conditions and, more particularly, to an improved means for preventing injury to an occupant's back and head.

The safety of occupants in vehicles is becoming increasingly important as the use and speed of vehicles of many forms mount and the incidence as well as severity of accidents increase. The normal cause of severe injuries or fatalities is the inertial load of an occupant manifested by his deceleration upon impact with relatively fixed structure. An occupant tends to continue in the direction he was going immediately before his vehicle underwent an impact or direction change. An unconstrained occupant will then be thrown against fixed objects in the vehicle, for example, a windshield, with a considerable force. It is this impact of a rapidly traveling occupant with relatively fixed objects which occasions the most severe injuries and highest number of fatalities in vehicular accidents.

Previous restraint systems used in vehicles employ a lap or seat belt which is mounted at either side of its user at two points to the vehicle and wraps around the occupant's pelvic region. Another system, which is gaining increased acceptance, combines the lap belt with a shoulder harness. The shoulder harness, through straps or the like, constrains the upper portion of the body and serves to prevent impact of the head and upper torso with structure immediately in front of him. The use of the lap belt, either alone or in combination with a shoulder harness, takes advantage of a human's strongest structural point: his pelvis. The line of constraint is approximately at the largest mass of the occupant with the result that the largest load is constrained without using other portions of the body as a load transfer intermediary.

The use of a lap belt alone allows the upper portion of the body to swing forward under impact conditions to strike objects close to the occupant. The number and proximity of objects which can cause injury are surprisingly large because the lap belt stretches in tension and the occupant tends to pull out from under the belt through the action of the large, unconstrained mass represented by his head and torso. Spine loading with a lap belt is generally in tension because only the lower torso is constrained by the belt which allows the upper body, head and arms, through their inertia, to go away from the line of constraint. The lap belt also suffers under lateral loading conditions because of its two-point mounting. The effective area of constraint of a lap belt is from the point of one hip across his front to the other hip point. Under lateral loading, however, the occupant is only constrained from one hip point to a point parallel to the direction of force.

Lap and shoulder harness combinations are generally satisfactory under low impact conditions. Under high impact, however, this arrangement performs in a highly unsatisfactory manner. The mass of an occupant between his lap belt and shoulder harness is unconstrained allowing it to move very rapidly in the direction of its inertial load. The spine is thus allowed to distend outwardly with a very high curvature and at a very rapid rate resulting in severe and often fatal loading. In addition, because the occupant's shoulders are restrained, the length of the spine which can effectively distribute the inertial load of the head is small. Under impact, the head whips in the direction of travel and loads the short, free portion of the spine with the entire inertial load of the head.

SUMMARY OF THE INVENTION

The invention provides a human restraint system and vest which are capable of restraining the bulk of an occupant's body, preventing severe loads on the occupant's spine and head injury.

In one form the invention provides a restraining vest which is adapted to be attached to a rigid, generally upright member such as a seat back or narrow column, preferably along a relatively narrow line. The vest is configured such that its point of attachment with the rigid member extends at least substantially along the length of the spine from the pelvis to a point intermediate the occupant's rib cage. The vest continues from this point of attachment into flaps which are capable of passing under an occupant's arms and between his legs and torso to encompass his pelvic region, abdomen and preferably his lower chest. These flaps, in use, are attached together by suitable means, but preferably by attachment means which do not use rigid masses. Rigid masses are preferably avoided to eliminate occupant hazard which would occur upon striking a hard, relatively massive object. One form of attachment means, for example, employs a fabric fastener system having engagable, mating hook and pile portions such as sold under the trademark "Velcro."

Modified versions of the restraint system described above include the use of straps adapted to extend over an occupant's shoulders from the back of the vest for attachment at the occupant's front. If desired, a crotch strap may also be used and conveniently tied in with the main restraining flaps and shoulder straps for ready attachment and detachment by an occupant at a common point. The columnar support may be extended to hold a helmet thereby restraining an occupant's head as well as his body under impact. For additional lateral support the lower portion of the vest may be tucked under to constrain the lower portion of an occupant's spine.

The vest and restraining system of this invention are capable of holding an occupant in place and protecting him against severe impact conditions by load transfer to the rigid support member. The vest is configured to wrap around and hold the occupant's pelvis, abdomen and lower chest from its point of attachment to the support member at the occupant's rear. The bulk of the inertial load caused by impact is therefore taken through the vest to the rigid support member and not by the occupant's spine. When compared to lap belt constraint, because the occupant is effectively constrained from his pelvic region through his lower chest, he is prevented from being thrust forward into fixed objects within the vehicle. In addition, through the large area of constraint provided by the vest, tension loads on the back are substantially reduced or eliminated. The advantages of the instant restraint system over the shoulder harness and lap belt combination are even more dramatic because under high load conditions the occupant's midsection, by being constrained, does not distend outwardly and load the occupant's spine. Furthermore, the constraint provided leaves a relatively long portion of the occupant's spine to resist head whipping which reduces the chance of neck injury or fracture. When the rigid support member is narrow or the point of attachment of the vest to the member narrow, the vest is effectively attached along an axis aligned with the occupant's back. This provides greater restraint against lateral forces because there is more area of the vest which constrains the occupant. Moreover, the vest may be adapted to provide even greater support and constraint for an occupant when it is adapted with shoulder straps, a crotch strap and, through an extension of the columnar support, means for constraining the occupant's head. These latter configurations are particularly important in military applications.

These and other features, aspects and advantages of the present invention will become more apparent from the following description, appended claims and drawings.

BRIEF DESCRIPTION OF THE FIGURES

FIGURE 1 shows a prior art lap belt restraining an occupant experiencing a forward directed inertial load;

FIGURE 2 shows a prior art lap and shoulder belt restraining an occupant experiencing a forward directed inertial load;

FIGURE 3 shows the restraint system of the present invention holding an occupant in his seat under impact conditions with his inertial load forward directed;

FIGURE 4 shows the restraint system of the present invention with a columnar support;

FIGURE 5 depicts an alternate embodiment of the restraint system of the present invention with an occupant experiencing a forward directed inertial load;

FIGURE 6 shows the embodiment of FIGURE 5 without an occupant;

FIGURE 7 shows the embodiment of FIGURES 5 and 6 with the fastening means detached;

FIGURE 8 shows an alternate embodiment of the present invention which employs an extended columnar support attached to a crash helmet;

DESCRIPTION OF THE PREFERRED EMBODIMENTS

Figure 9:
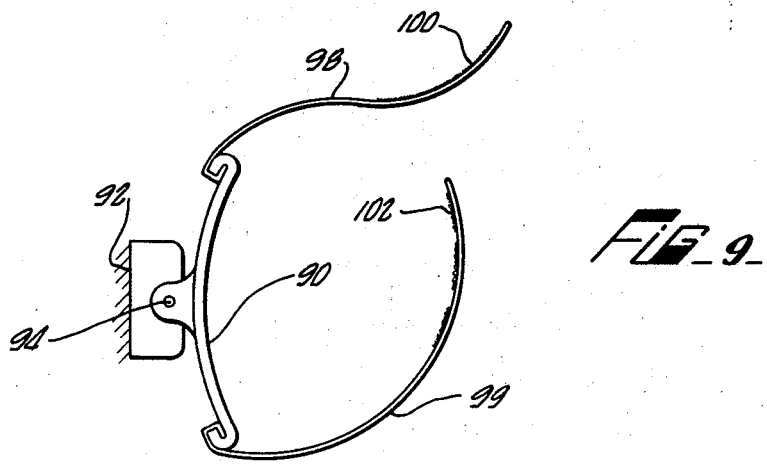
FIGURE 9 is a top view of still another embodiment of the present invention.

FIGURES 1 and 2 depict prior art restraint systems. Restraint system 10, shown in FIGURE 1, comprises a lap belt 11 mounted to the frame 12 of a vehicle on either side of an occupant's seat 14. Lap belt 11 restrains the major structural assembly of the body: the pelvis. Under high load conditions resulting from impact of the vehicle in which the occupant is riding, the occupant tends to continue in the direction of travel he experienced just before impact, in the case illustrated, forward or parallel to the axis of his seat. The vehicle and restraint system, however, tend to stop relative to the occupant allowing the occupant to move away from his seat. Because the greatest mass of the occupant is located above his pelvis, the resultant inertial load tends to pull him out from under the seat belt, that is, the seat belt has a tendency to lower over the occupant's legs. The inertial load causes the occupant's limbs to flare outwardly in a forward direction and bend his torso and head around restraining belt 11 towards the floor of the vehicle. The belt has a degree of elasticity and play allowing some movement of the occupant away from his seat 14 which increases the likelihood of his impact with fixed structure in the vehicle. The mass of the body above the belt produces by its inertia a force along the occupant's spine which places the spine in tension. Lateral loading of an occupant produces, in addition to tensile loading, shear and torsional stresses.

In an effort to constrain the upper torso of an occupant it is frequently the practice to employ a shoulder harness. This type of constraint is shown in FIGURE 2. Lap belt 20, as in FIGURE 1, is secured at two points to frame 12 and shoulder harness 22 is mounted to constrain the occupant's upper body by extending over his shoulders for attachment at his front. Under high inertial loading conditions produced, for example, by a head-on collision, an occupant will tend in the direction of travel he was experiencing just before impact, thus he will normally move away from seat 14. As he tends away from the seat he is restrained by belt 20 and harness 22 but the bulk of his torso is relatively unconstrained allowing his abdomen to extend away from the back of seat 14 to produce an unnatural and severe strain on the occupant's back. This is shown by the abnormal curvature of the occupant's spine in FIGURE 2. The upper portion of the occupant is restrained by harness 22 which serves to keep him from striking objects to his immediate front. However, his head is unsupported allowing it to be thrust violently forward and down which produces extremely serious shear loading on his neck.

The restraint systems depicted in the remaining figures overcome the disadvantages of the lap belt and lap belt-shoulder harness combination just discussed. FIGURE 3 shows a constraint system 24 wherein an occupant is constrained by vest 25 as he experiences a load in the direction of the arrow. The vest includes contoured flaps 27 and 29 which are capable of overlapping, fixed engagement with an occupant. The vest may be fabricated from any suitable material such as a strong synthetic fiber. Vest 25 is affixed to vertical support member 26 which in turn is fixed to frame 28 through seating structure 30. FIGURE 4 depicts a vest 32 which is a slightly modified version of vest 25 in that it includes a flap 34 adapted to fit under an occupant's spine and along the lower reaches of his buttocks to increase lateral force constraint.

Vest 32 includes a back portion 36 in the form of a sleeve for the vest's mounting on columnar support member 38. Columnar member 38 is secured to seating frame structure 40 in the back of seat 42. The frame structure is secured to the vehicle. The vest includes flaps 44 and 46 which are adapted to extend from rear portion 36 under an occupant's arm for overlying relationship in front of an occupant. These flaps extend downwardly from the occupant's shoulder blades to and around his lower chest. The lower edges of flaps 44 and 46, denominated by reference numerals 43 and 45, respectively, are adapted to extend at least from the point of attachment of an occupant's spine and pelvis up along a line between his legs and torso and across his pelvis, abdomen and lower chest regions. Flap 34 is adapted to fit under an occupant's spine and along the lateral, lower periphery of his buttocks. Flaps 44 and 46 are secured together when an occupant is using the restaint system, by fabric or fastening tape 48. A suitable fastening tape is marketed on the trademark "Velcro" and consists of one strip having hooks and another pile which interact to resist shear forces tending to pull the two mating fabric portions apart.

In FIGURE 3, restraint system 24 is shown holding an occupant under an impact condition wherein the inertial load is directed in a direction faced by the occupant; there is no lateral loading. Under these loading conditions, the constraint provided by constraint system 24 acts from line 50 around the front of the occupant to a mating line, not shown, on the other side of the occupant. Line 50 and its mating line represent the point of contact of vest 25 with the widest portion of the occupant's body. Contoured flap 27 extends from line 50 around the occupant's lower chest, completely over his abdomen and over his frontal pelvic region. Contoured flap 29 is similarly disposed on the other side of the occupant. Thus, the major mass of the occupant is fully constrained. The inertial load of the occupant is transferred through the vest to columnar support member 26 and ultimately absorbed by frame 28. The attachment of vest 25 along the length of columnar support member 26 prevents unsupported or unconstrained mass from straining the occupant's back. The upper portion of the occupant is not fully constrained. But the mass acting on the unconstrained portion of the body is relatively small. The length of the occupant's spine between the uppermost point of constraint and his neck is relatively long when compared to a shoulder harness allowing the occupant's head and spine to bend over under impact conditions without a sharp spinal curvature thereby decreasing the shear stresses experienced with a harness. Flaps 27 and 29 rearwardly of line 50 are greater in constraint area than the portions forward of the line in order to increase lateral constraint while maintaining occupant comfort and motor flexibility.

The use of a narrow columnar support, such as shown in FIGURE 4, allows an occupant freedom of movement and provides excellent constraint under lateral loads. Lateral constraint is increased over a two-point connection system, as typified by lap belts, because the vest can follow the line of inertial force by following the occupant's reaction to such force. Columnar support may also be provided by attaching the vest to the support member along a narrow line.

FIGURES 5, 6 and 7 depict a modified form of the present constraint system. The vest and constraint system previously described is modified to include a buckle in place of the fabric fastener, a crotch strap and two shoulder straps. Vest 60 includes flaps 62 and 64 which may be fastened together at the front of an occupant's body by buckle 66. Shoulder straps 68 and 70 extend from back portion 72 for connection to buckle 66 through their buckling elements 66a and 66b. Crotch strap 74 is adapted to extend beneath an occupant for connection to buckle 66 through its buckling element 66c. Any number of well known prior art buckles may be used to effect the single point connection shown in FIGURES 5 through 7. The type illustrated here employs male latching elements in the form of tongues on the crotch and shoulder strap buckling elements. The tongues of buckling elements 66a and 66b are received in slots of the right- and left-hand sides, as viewed facing the illustrated vest, of buckle 66 and secured by locking means (not shown). The tongue of buckling element 66c has a transverse hole (not shown) for receiving the shank of the illustrated T-shaped latching element of the right half of buckle 66. The head of the T-shaped latching element is received in a locking slot of the left half of buckle 66. Each of the right and left halves of buckle 66 may have a recess for the tongue of buckling element 66c so that the clean appearance shown in FIGURE 6 is effected when the single point connection is made. Back portion 72 is in the form of a sleeve which fits over a rigid columnar support member 76. The support member is relatively narrow to provide the enhanced lateral constraint and occupant movement flexibility previously discussed. The buckle preferably is operable to release the buckling elements by a single, quick operator action to provide rapid egress when necessary.

The occupant is secured in vest 60 to seat 78 by joining flaps 64 and 62, shoulder straps 68 and 70 and crotch strap 74 through buckle 66 as is shown in FIGURE 5. Under impact conditions, the occupant will be constrained in much the same manner as that previously described, however, his upper body is further constrained by the shoulder straps and additional constraint is provided by crotch strap 74. To avoid harmful head whipping attendant to an unconstrained head, the upper portion of columnar support 76 may be made slightly flexible.

FIGURE 8 shows the embodiments of FIGURES 5 through 7 with the columnar support extended for attachment to the crash helmet for the restraint of an occupant's head. Columnar support 80 extends upwardly from the back of the occupant for attachment to crash helmet 82. This upward extension can be made somewhat flexible to give an occupant the freedom he requires. In addition, extension 80 may be made to pivot to allow the free turning of the occupant's head. The importance of extension 80 is to restrain the head, therefore the particular configuration of the extension and its capabilities are not important except as they relate to this restraint.

Figure 10:
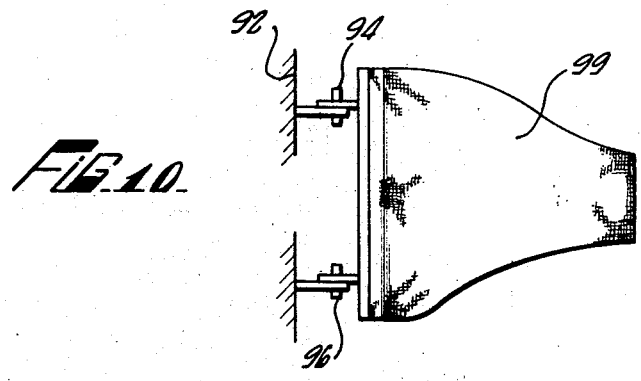
FIGURE 10 is a side view of the embodiment shown in FIGURE 9.
Figure 11:
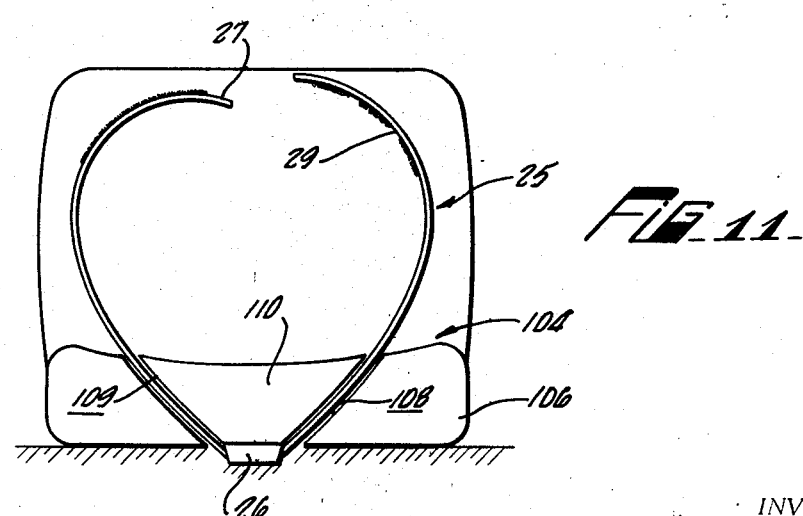
FIGURE 11 shows a typical manner of mounting the restraint system of the present invention in an occupant's seat.

FIGURES 9 and 10 depict still another alternate form of the vertical support member and constraint vest. Vertical support member 90 consists of a back contoured to the shape of an occupant. Back 90 is pivotally connected to frame 92 at pivot connections 94 and 96. Flaps 98 and 99 are contoured to fit under an occupant's arm and over his lap for connection through fabric fasteners 100 and 102. Pivotal connections 94 and 96 act as a single axis connection and therefore provide much of the lateral constraint and occupant flexibility of the single columnar support used in the previous embodiments.

FIGURE 10 shows one method mounting the restraint system in a seat and satisfying an occupant's comfort requirements. With reference to restraint system 24 previously described, flaps 27 and 29 of vest 25 extend from rigid columnar support 26 to encompass an occupant. Columnar support 26 is secured to a frame behind seat 104. Seat back 106 has a cushion with channels 108 and 109 for the passage of flaps 27 and 29, respectively. Middle portion 110 of seat back 106 then prevents direct occupant contact with the columnar support.

The constraint system and vest of the present invention greatly reduce the opportunity of severe occupant injury from impact with a relatively immobile object or high loads on his spine. The occupant is constrained from his pelvic region to at least his lower chest thereby limiting the amount of forward travel the top part of his body can undergo and the number of objects it can encounter. The rigid columnar support provides a load transfer mechanism which replaces the spine as a load carrier with the result that the likelihood of back injury is substantially reduced. In terms of comparison with previously known restraint systems, the columnar support substantially reduces tension loads on the spine over a lap belt because the occupant is not allowed to bend over to any substantial degree and the support takes a large amount of inertial load through the vest by virtue of the vest's placement around the torso and large area of constraint. The ontoward stress on the spine occasioned by the use of a lap belt and shoulder harness is avoided because of the abdomen constraint provided by the invention.

The present invention has been described with reference to certain preferred embodiments. It will be understood by those skilled in the art, however, that the spirit and scope of the appended claims should not necessarily be limited to the foregoing description.

What is claimed is:
1. A human constraint system comprising:
 (a) a vehicle having a seat for an occupant;
 (b) a rigid support member secured to the seat of the vehicle to accommodate the seat occupant while providing an inflexible support length along the occupant's spine of at least the distance between the occupant's pelvic region and a point intermediate his rib cage; and
 (c) a constraint vest fabricated from flexible material including

(i) a rear portion having a dimension equal to the support length, the vest being attached to the support member along the support length through the rear portion all along this dimension, (ii) a first flap extending from one side of the rear portion and sized to extend at least partially around the front of the occupant's torso to overlie and constrain his pelvic region, abdomen and lower chest, (iii) a second flap extending from the other side of the rear portion and sized to extend at least partially around the front of the occupant's torso to overlie and constrain his pelvic region, abdomen and lower chest, and (iv) means for removably fastening the first and second flaps securely together such that the occupant's pelvic region, abdomen and lower chest are within and constrained by the fastened straps, whereby under impact conditions a large portion of the occupant's inertial load is transferred through the flaps to the rigid support member without his spine being subjected to such loading.

2. The constraint system claimed in claim 1 wherein the rear portion of the vest is attached to the rigid support member such that columnar constraint is provided.

3. The constraint system claimed in claim 1 wherein the rear portion of the vest is defined by a narrow sleeve, the rigid support member being received in the sleeve, whereby columnar constraint is effected completely along the support length.

4. The constraint system claimed in claim 3 wherein the vest includes shoulder straps which are capable of extending over the occupant's shoulders, and means is provided for securing the shoulder straps in place such that they are operable to constrain the occupant's shoulders.

5. The constraint system claimed in claim 4 wherein the vest includes a crotch strap, and means is provided for securing the crotch strap in place to constrain the occupant's crotch.

6. The constraint system claimed in claim 5 wherein the vest has a bottom flap portion capable of extending under the occupant's spine and around the lateral, lower periphery of his buttocks.

7. The constraint system defined in claim 6 wherein the rigid support member is adapted to be attached to a helmet to constrain the occupant's head.

8. The constraint system claimed in claim 3 wherein the rigid support member is adapted for attachment to a helmet to constrain the occupant's head.

9. The constraint system claimed in claim 5 wherein the means for securing the crotch strap, shoulder straps and first and second flaps is operable to secure these constraint elements at essentially a single point.

10. The constraint system claimed in claim 3 wherein the first and second flaps are capable of overlapping relationship in use, and the securing means for the first and second flaps includes a tape or fabric type fastener.

11. The constraint system claimed in claim 10 wherein the vest includes a bottom flap portion capable of extending under the occupant's spine and around the lateral, lower periphery of his buttocks.

12. A human constraint system comprising:
(a) a vehicle having a seat for an occupant;
(b) a rigid support member secured to the seat of the vehicle to accommodate the seat occupant, the support member having a support length from the occupant's pelvic region at least to his rib cage; and
(c) a constraint vest of flexible material including
(i) a first flap attached to the support member all along the support length and capable of extending at least partially around the occupant to constrain at least his abdomen and pelvic region,
(ii) a second flap attached to the support member all along the support length and capable of extending at least partially around the occupant to constrain at least his abdomen and pelvic region, and
(iii) means for attaching the first and second flaps together such that they cooperate to constrain at least the occupant's abdomen and pelvic region.

13. The constraint system claimed in claim 12 wherein the first and second flaps are contoured to extend under the occupant's arms and from the point of connection of his spine to his pelvis along a line between his legs and torso.

14. The constraint system claimed in claim 13 wherein the first and second flaps are capable of overlapping relationship over the occupant's abdomen.

15. The constraint system claimed in claim 14 wherein the attachment means includes a fastening tape having mating hook and pile portions.

16. The constraint system claimed in claim 13 including shoulder straps operable to constrain the occupant's shoulders.

17. The constraint system claimed in claim 16 including a crotch strap operable to constrain the occupant's crotch.

18. The constraint system claimed in claim 13 wherein the first and second flaps are attached to the rigid support member such that these flaps are capable of contact with the occupant's back and columnar support is provided.

19. The constraint system claimed in claim 13 wherein the rigid support member is configured to span the breadth of the occupant's back.

20. The constraint system claimed in claim 19 including a frame and wherein the rigid support member is pivotally connected to the frame.

References Cited

UNITED STATES PATENTS

| Number | Date | Name | Class |
|---|---|---|---|
| 2,181,689 | 11/1939 | Bell | 128—78 |
| 2,973,030 | 2/1961 | Matthewson | 128—78 X |
| 3,052,236 | 9/1962 | Schrieber | 128—78 |
| 3,095,875 | 7/1963 | Davidson et al. | 128—78 |
| 3,292,616 | 12/1966 | Freeman | 128—78 |
| 3,407,807 | 10/1968 | Giberson | 128—134 |
| 1,616,349 | 2/1927 | Cagle | 297—389 |
| 1,898,090 | 2/1933 | Lethern | 297—389 |
| 2,819,095 | 1/1958 | Haltmar | 297—385 |
| 2,833,343 | 5/1958 | Benson | 297—387 |
| 3,099,261 | 7/1963 | Doss et al. | 297—384 X |
| 3,125,373 | 3/1964 | Boatman | 297—384 |
| 3,241,881 | 3/1966 | Carnahan et al. | 297—385 |
| 3,321,247 | 5/1967 | Dillender | 297—389 |
| 3,329,464 | 7/1967 | Barwood et al. | 297—389 |

JAMES T. McCALL, Primary Examiner

U.S. Cl. X.R.

280—150